United States Patent
Aho-Mantila et al.

(10) Patent No.: US 7,708,224 B2
(45) Date of Patent: May 4, 2010

(54) AIRCRAFT WING, FASTENING ARRANGEMENT, AND INTERMEDIATE SUPPORT

(75) Inventors: Antti Aho-Mantila, Halli (FI); Pentti Ahtonen, Kuhmo (FI); Juha Halme, Tampere (FI); Lauri Halme, Tampere (FI); Mikko Hoffrén, Nokia (FI); Outi Tervala, Nokia (FI)

(73) Assignee: Patria Aerostructures Oy, Halli (FI)

( * ) Notice: Subject to any disclaimer, the term of this patent is extended or adjusted under 35 U.S.C. 154(b) by 673 days.

(21) Appl. No.: 11/703,600

(22) Filed: Feb. 7, 2007

(65) Prior Publication Data

US 2009/0212154 A1     Aug. 27, 2009

(30) Foreign Application Priority Data

Feb. 9, 2006    (FI)    .................. 20065092

(51) Int. Cl.
*B64D 35/00* (2006.01)
(52) U.S. Cl. .................. 244/54; 244/123.1; 248/554
(58) Field of Classification Search .................. 244/54, 244/123.1; 248/554
See application file for complete search history.

(56) References Cited

U.S. PATENT DOCUMENTS

| | | | | | |
|---|---|---|---|---|---|
| 3,831,888 | A | * | 8/1974 | Baker et al. | .................. 244/54 |
| 3,848,832 | A | * | 11/1974 | Stanley et al. | .................. 244/54 |
| 4,555,078 | A | * | 11/1985 | Grognard | .................. 244/54 |
| 5,810,287 | A | * | 9/1998 | O'Boyle et al. | .................. 244/54 |
| 7,063,290 | B2 | * | 6/2006 | Marche | .................. 244/54 |
| 7,350,747 | B2 | * | 4/2008 | Machado et al. | .................. 244/54 |
| 7,451,947 | B2 | * | 11/2008 | Machado et al. | .................. 244/54 |
| 7,607,609 | B2 | * | 10/2009 | Levert | .................. 244/54 |
| 7,624,945 | B2 | * | 12/2009 | Diochon et al. | .................. 244/54 |
| 2004/0129832 | A1 | | 7/2004 | Marche | |
| 2005/0082423 | A1 | | 4/2005 | Whitmer et al. | |
| 2007/0107189 | A1 | * | 5/2007 | Prichard et al. | .......... 244/123.1 |
| 2007/0108341 | A1 | * | 5/2007 | Diochon et al. | .................. 244/54 |
| 2007/0205323 | A1 | * | 9/2007 | Lionel et al. | .............. 244/53 R |
| 2009/0200418 | A1 | * | 8/2009 | Beaufort | .................. 244/54 |

FOREIGN PATENT DOCUMENTS

EP    0 967 147    12/1999

* cited by examiner

*Primary Examiner*—Christopher P Ellis
(74) *Attorney, Agent, or Firm*—Ladas and Parry LLP

(57) ABSTRACT

The invention relates to an aircraft wing, a fastening arrangement, and an intermediate support. A support structure of a wing (1) comprises transverse wing ribs (7a, 7b), between which an intermediate support (10) is arranged for providing a fastening point for a motor (9). The intermediate support comprises a vertical first side part (15a) and a vertical second side part (15b) which are at a distance from one another and connected to one another at their lower part by means of a horizontal bottom part (16) at least at a fastening lug (11). The lug is supported on the bottom part of the intermediate support.

17 Claims, 4 Drawing Sheets

AIRCRAFT WING, FASTENING ARRANGEMENT, AND INTERMEDIATE SUPPORT

BACKGROUND OF THE INVENTION

The invention relates to an aircraft wing, a fastening arrangement in an aircraft, and an intermediate support arrangeable between two support elements of a wing. The object of the invention is described in greater detail in the preambles of the independent claims.

A wing of aircraft, such as airplanes and the like, comprises skin plates, between which there is the wing's actual support structure typically comprising a front spar and a rear spar and wing ribs connecting them. Furthermore, there are usually a plurality of stringers between the wing ribs and the skin plates. The motor of an aircraft may be suspended on the side of the lower surface of the wing, in which case the support structure of the wing should comprise suitable support points for it. In some cases the motor must be placed in the section between two wing ribs, wherefore a transverse intermediate support, to which a fastening lug of the motor may be fastened, must be arranged between the adjacent wing ribs. Today it is common to use intermediate supports, the cross section of which comprises two horizontal flanges and a vertical flange therebetween, thus having the shape of an I beam. There is not much space in the wing and thus the I beam is flat, whereby the construction has a disadvantage that the upper horizontal flange of the I beam complicates the bolting of the fastening lug. Due to the structure of the I beam, the fastening bolts must also be disposed far from one another.

BRIEF DESCRIPTION OF THE INVENTION

It is an object of the present invention to provide a new and improved aircraft wing, fastening arrangement in a wing and intermediate support.

The wing of the invention is characterized in that the cross section of the intermediate support comprises a vertical first side part and a vertical second side part at a distance from one another; that at least at the fastening lug there is a bottom part, which is attached to the lower parts of the side parts and is transverse to the side parts; and that the fastening lug is fastened to the bottom part of the intermediate support.

The fastening arrangement of the invention is characterized in that the cross section of the intermediate support comprises a vertical first side part and a vertical second side part at a distance from one another; that at least at the fastening lug there is a bottom part, which is attached to the lower parts of the side parts and is transverse to the side parts; and that the fastening lug is fastened to the bottom part of the intermediate support.

The intermediate support of the invention is characterized in that the cross section of the intermediate support comprises a vertical first side part and a vertical second side part at a distance from one another; that at least at the fastening lug there is a bottom part, which is attached to the lower parts of the side parts and is transverse to the side parts, whereby the fastening lug may be fastened to the bottom part of the intermediate support; and that, when viewed from the side, the upper edges of the first side part and those of the second side part curve towards the bottom part, whereby in the centre section the intermediate support extends a shorter distance upwards than at the ends.

The idea of the invention is that the intermediate support comprises side parts at a distance from one another, between which there is a bottom part at least at the fastening lug. The bottom part is attached to the lower parts of the side parts. The fastening lug is fastened to the bottom part between the side parts.

The invention provides the advantage that the side parts and the bottom part may be dimensioned in such a manner that a good ratio between weight and stiffness is achieved. It is also simple to fasten the fastening lug from between the side parts. The fastening flange of the fastening lug may also be relatively narrow when it is fastened to the bottom part of the intermediate support.

The idea of an embodiment of the invention is that the fastening lug is fastened to the intermediate support by means of a plurality of fastening bolts. The fastening bolts extend to the space between the side parts.

The idea of an embodiment of the invention is that at the fastening lug one or more reinforcing plates are arranged against the upper surface of the bottom part of the intermediate support and between the side parts.

The idea of an embodiment of the invention is that, when viewed from the side, the upper edges of the side parts curve towards the bottom part. In this manner, it is possible to provide a sufficient height for the wing's crawl space above the intermediate support.

The idea of an embodiment of the invention is that the fastening flange is arranged in the centre section of the intermediate support, where, when viewed from the side, the height dimension of the intermediate support is smaller than in the end sections. In terms of strength properties, the point of the greatest load is in the centre section of the intermediate section, exactly at the fastening lug.

The idea of an embodiment of the invention is that the intermediate support comprises one or more cover parts, which are arranged to connect free upper parts of the side parts to one another. At least at the cover part, the intermediate support has thus a cross section with the shape of a closed tube structure. As is known, the box structure is advantageous in terms of strength properties.

The idea of an embodiment of the invention is that, when viewed in the longitudinal direction of the intermediate support, the cover part is arranged at the fastening lug, whereby the fastening lug or a corresponding fastening element is fastened to the intermediate support at the closed tube structure.

The idea of an embodiment of the invention is that the cover part is a piece which is manufactured separately from the rest of the intermediate support structure and fastened to the intermediate support by suitable fastening elements. The cover part may thus be arranged in its place after the fastening lug is fastened to the intermediate support. In addition, when the cover part is a separate piece, it may be easier to manufacture the intermediate support. Furthermore, it is possible to detach and attach the cover part later on, if necessary.

The idea of an embodiment of the invention is that the cover part is an integral, fixed part of the intermediate part. At the cover part, the intermediate support then has a tubular cross section.

The idea of an embodiment of the invention is that the cover part comprises one or more openings. The openings may facilitate the arranging of bolts of the fastening lug in their places. Particularly when the cover part is fixedly fastened to the side parts, the openings facilitate the fastening of the fastening lug. Furthermore, the openings make the cover part lighter.

The idea of an embodiment of the invention is that the side part comprises one or more openings or corresponding lightenings. The side part may further comprise one or more reinforcing ribs, reinforcing inserts or other similar reinforcing elements. Thus, the side part may be made very stiff and light at the same time.

The idea of an embodiment of the invention is that the upper edges of the first side part and second side part of the intermediate support comprise transverse broadening sections. The broadening section may substantially have the length of the entire intermediate support or it may only extend along a part of the intermediate support. The broadening section may, for instance, only be located at the fastening lug. The broadening section may stiffen the intermediate support and also facilitate the fastening of the cover part.

The idea of an embodiment of the invention is that the lower surface of the intermediate support is substantially even and parallel to the bottom skin plate at least at the fastening lug.

The idea of an embodiment of the invention is that the intermediate support comprises two separate side components, namely the first side component and the second side component. Each side component comprises a substantially vertical side part and a substantially horizontal bottom part. Furthermore, the side components are connected to one another at least at their bottom parts. A component structure facilitates the manufacture of the intermediate support.

The idea of an embodiment of the invention is that the intermediate support is made of a composite material. The composite material comprises one or more reinforcing fibers and one or more binders. The reinforcing fiber may be carbon fiber, for instance. The binder may be, for instance, a plastic material. The plastic material may be a thermoplastic or a thermosetting plastic. A typical binder is resin.

BRIEF DESCRIPTION OF THE FIGURES

Embodiments of the invention are explained in greater detail in the attached drawings, in which FIG. 1 schematically shows an aircraft wing from below, FIG. 2 schematically shows a cross section of a part of the wing of FIG. 1 and of the support of the rear part of the motor from direction A, FIG. 3 schematically shows an intermediate support according to the invention, FIG. 4 schematically shows a top view of a second intermediate support according to the invention, FIG. 5 schematically shows components of a third intermediate support according to the invention, separated from one another, and FIG. 6 schematically shows a fastening arrangement of the invention cross-cut at the fastening lug and seen in the longitudinal direction of the intermediate support.

For the sake of clarity, some embodiments of the invention are shown as simplifications in the figures. Like parts are denoted with like reference numerals in the figures.

DETAILED DESCRIPTION OF SOME EMBODIMENTS OF THE INVENTION

Figure 1:
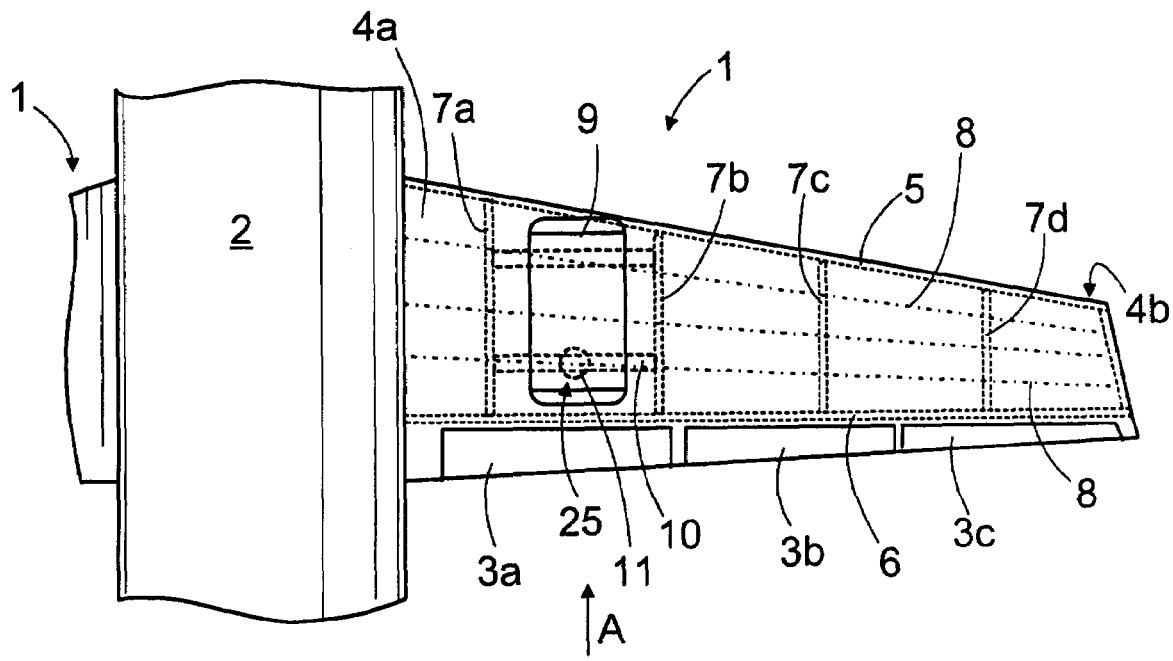

FIG. 1 shows an aircraft wing 1, which is attached to a frame 2. The trailing edge of the wing 1 may comprise movable control surfaces 3a to 3c. The wing 1 may comprise a top skin plate 4a and a bottom skin plate 4b, between which there is a wing support structure, which may comprise a front spar 5 and a rear spar 6 and a plurality of wing ribs 7 arranged between the ribs. Thus, the front spar and the rear spar 5, 6 are reinforcements substantially in the longitudinal direction of the wing, whereas the wing ribs 7 are reinforcements in the transverse direction of the wing. In addition, the support structure may comprise a plurality of stringers 8, which may be fastened to the inner surface of the skin plates 4a, 4b and to the wing ribs 7.

A motor 9 may be arranged on the side of the lower surface of the wing 1. When the motor 9 is positioned in the section between two adjacent wing ribs 7a, 7b, one or more intermediate supports 10, to which a fastening lug 11 of the motor 9 may be fastened, are arranged between the wing ribs 7a, 7b for supporting the motor 9. The fastening of the front part of the motor 9 may resemble or differ from the fastening of the rear part of the motor.

Figure 2:
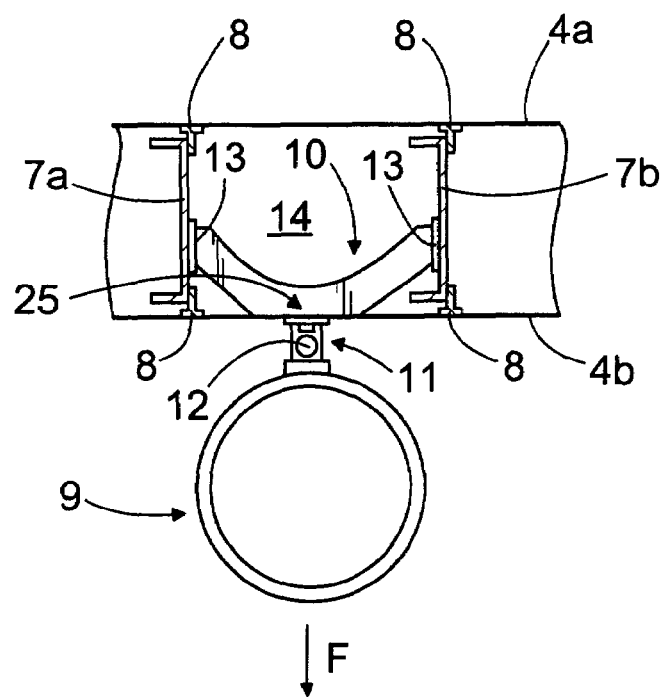

FIG. 2 illustrates the fastening of the rear part of the motor 9 by means of the fastening lug 11 to the intermediate support 10, which transmits at least a load F that the mass of the motor 9 produces in the downward direction to the first wing rib 7a and to the second wing rib 7b. The fasten-fastening lug 11 may be connected to one or more lugs in the motor by means of one or more connecting pins 12, for example. The intermediate support 10 may be fastened by means of fastening elements 13 to the flank surfaces of the wing ribs 7a, 7b. As FIG. 2 shows, the upper part of the intermediate support 10 may curve downwards in the centre section, whereby a crawl space 14 is produced between the intermediate support 10 and the top skin plate 4a, facilitating both the assembly of the wing and the maintenance and inspection work. The lower surface of the intermediate surface 10 may also be substantially even at the fastening lug 11 so that it may be set firmly against the bottom skin plate 4b. The lower surface of the intermediate support 10 may slant upwards at its end sections, which allows the horizontal flanges of the wing ribs 7a, 7b, stringers and the like to extend freely. FIG. 2 shows a feasible support structure of the wing 1.

Figure 3:
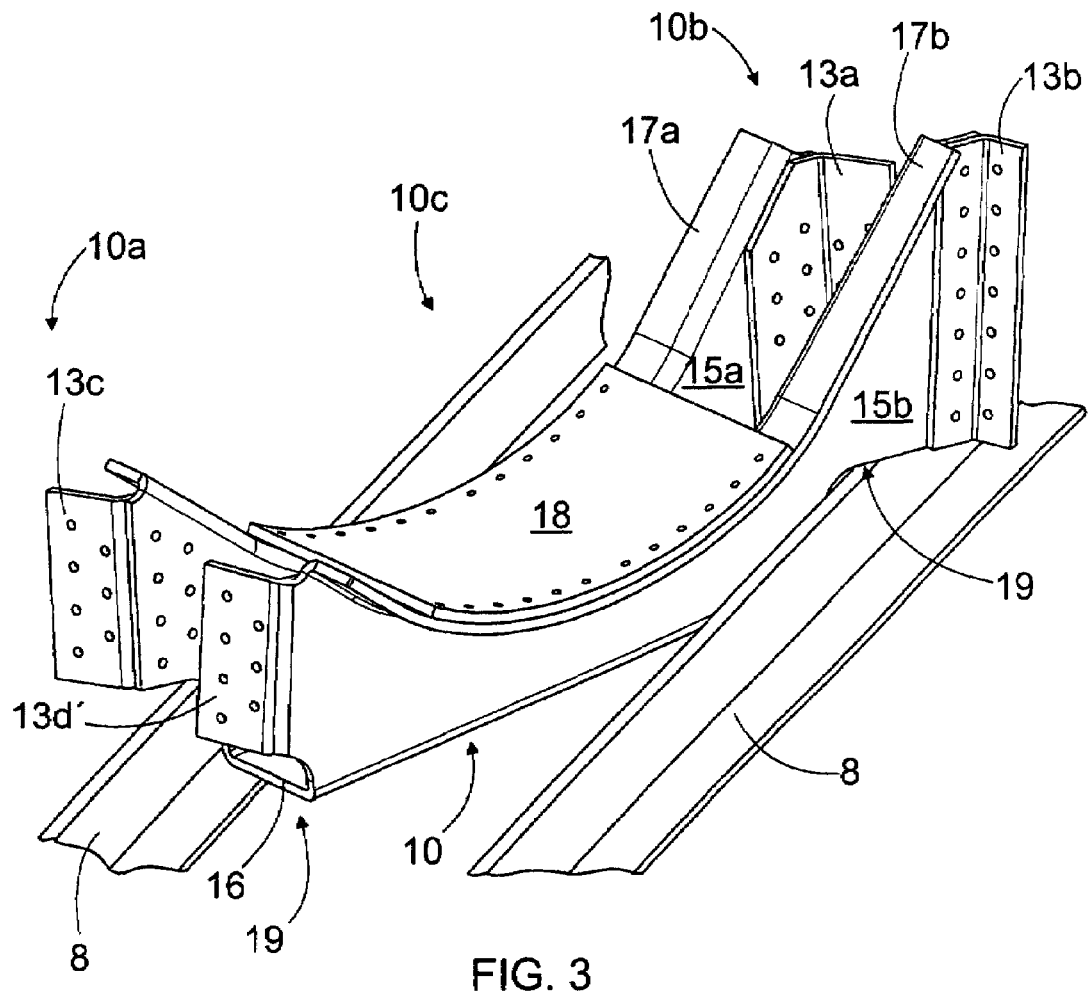

FIG. 3 shows an intermediate support 10, which comprises a vertical first side part 15a and, at a distance from it, a vertical second side part 15b. At their lower parts the side parts 15a, 15b are connected to a horizontal bottom part 16. The side parts 15a, 15b and the bottom part 16 may form a structure with a substantially U-shaped cross section from a first end 10a of the intermediate part 10 to its second end 10b or to at least a centre section 10c of the intermediate part 10. Free upper edges of the side parts 15a, 15b may curve downwards, whereby, when viewed from the side, the intermediate support 10 has the smallest height in the centre section 10c. The free upper edges of the side parts 15a, 15b may comprise broadening sections 17a, 17b, which may be directed away from one another, as shown in FIG. 3, or they may alternatively be directed towards one another. The broadening sections 17a, 17b may extend along the entire length of the free upper edge, or in some cases they may only extend over the centre section 10c of the intermediate support. With respect to bending, the broadening sections 17a, 17b may stiffen the structure of the intermediate support 10. The intermediate support 10 may further comprise a cover part 18, which may be a curved sheet-like piece manufactured separately and fastened, for instance, by rivets, screws or a glue to the free upper parts of the side parts 15a, 15b. The broadening sections 17a, 17b provide a good fastening point for the cover part 18. Instead of one uniform cover part 18, there may be a plurality of cover parts.

The intermediate support 10 may be fastened to the wing ribs 7a, 7b by means of fastening elements 13a to 13d. The fastening elements 13a to 13c may be separate pieces, such as corner pieces, which may be fastened to the intermediate support and, correspondingly, to the wing rib by rivets, screws or the like. Alternatively, the fastening elements may be protrusions integrated into the structure of the intermediate support 10, an example of which is the fastening element 13d' shown in FIG. 3.

As illustrated by FIG. 3, at the first end 10a and the second end 10b the lower part of the intermediate support 10 may be provided with openings 19 to enable free extension of the stringers 8 of the wing.

Figure 4:
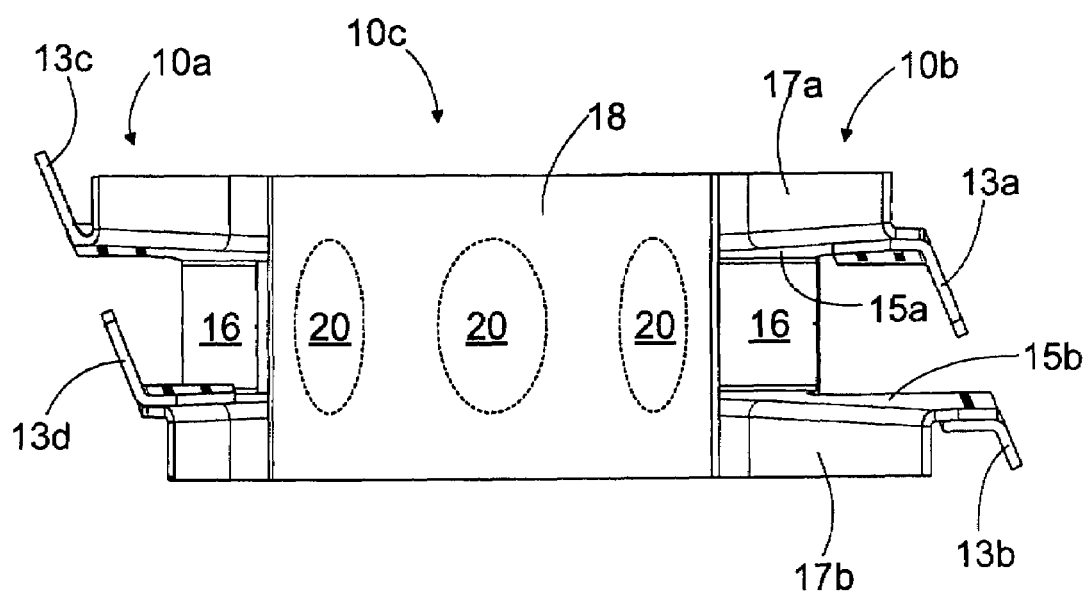

FIG. 4 shows an alternative construction of the intermediate support 10 from above. Unlike in the solution shown in FIG. 3, the cover part 18 may be an integral part of the intermediate support 10, in which case it may comprise one or more through holes 20 to facilitate the mounting of the fastening lug. If the cover part 18 is a separate piece fixedly fastened to the intermediate support 10, it is advantageous to provide the cover part with a hole 20. The holes 20 also make the cover part 18 lighter.

Figure 5:
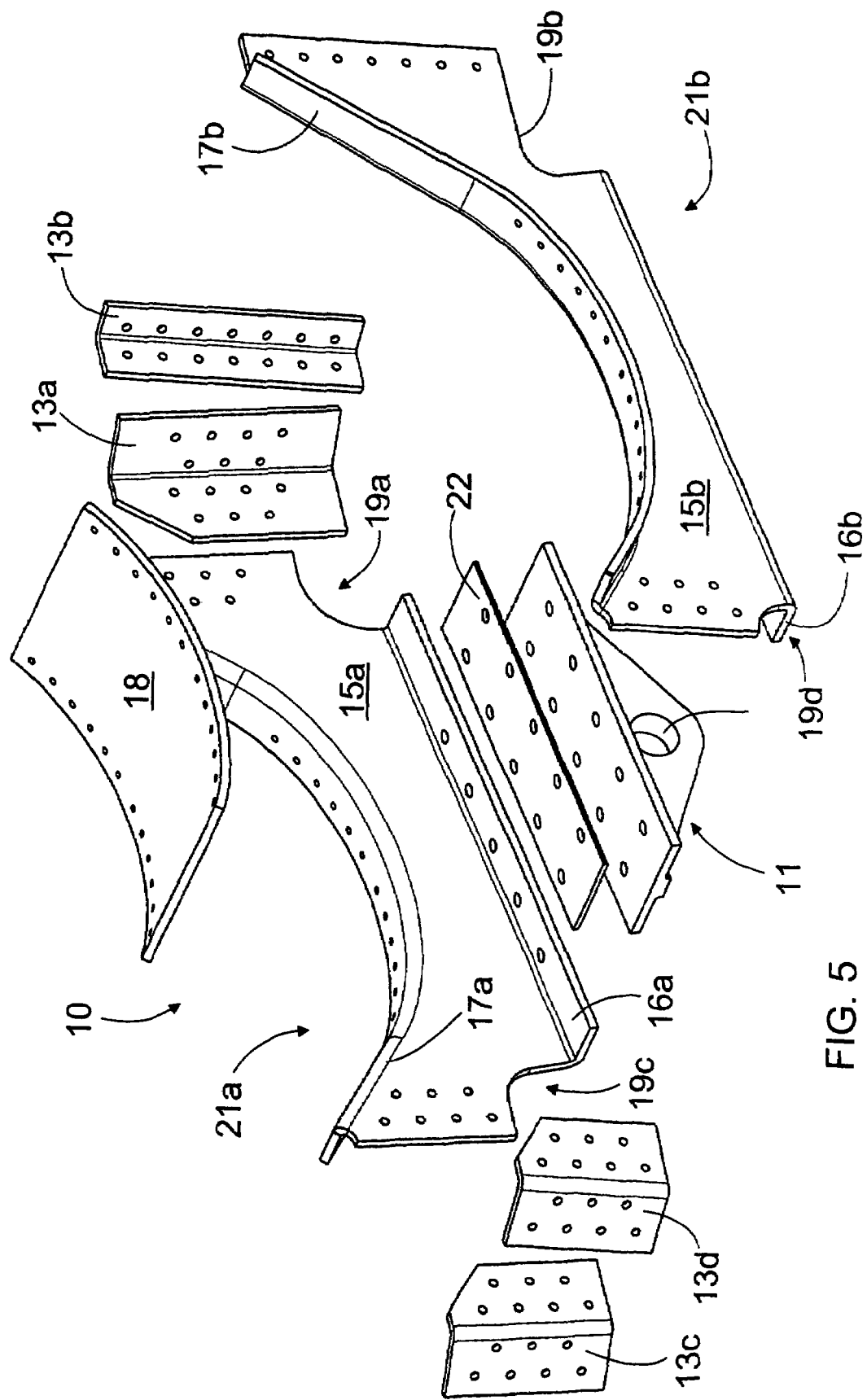

FIG. 5 shows a third alternative construction of the intermediate support 10 as an exploded view. In this case, the intermediate support 10 comprises a first side component 21a and a second side component 21b, which may be connected to one another. Each side component 21a, 21b comprises its own side part 15a, 15b and its own bottom section 16a, 16b. The bottom sections 16a, 16b may be connected to one another, for instance, by means of a reinforcing plate 22 or other suitable fastening means. As can be seen later in connection with FIG. 6, a seam 23 is formed between the bottom sections 16a, 16b. Also the cover part 18 fastens the side components 21a, 21b to one another.

As shown in FIG. 5, apart from the openings 19a to 19d the side components 21a, 21b may be similar, and thus they may be made of similar preforms, which may later be provided with openings by chip removing machining, for example. For the assembly, the first side component 21a is turned 180° with respect to the second side component 21b.

Figure 6:
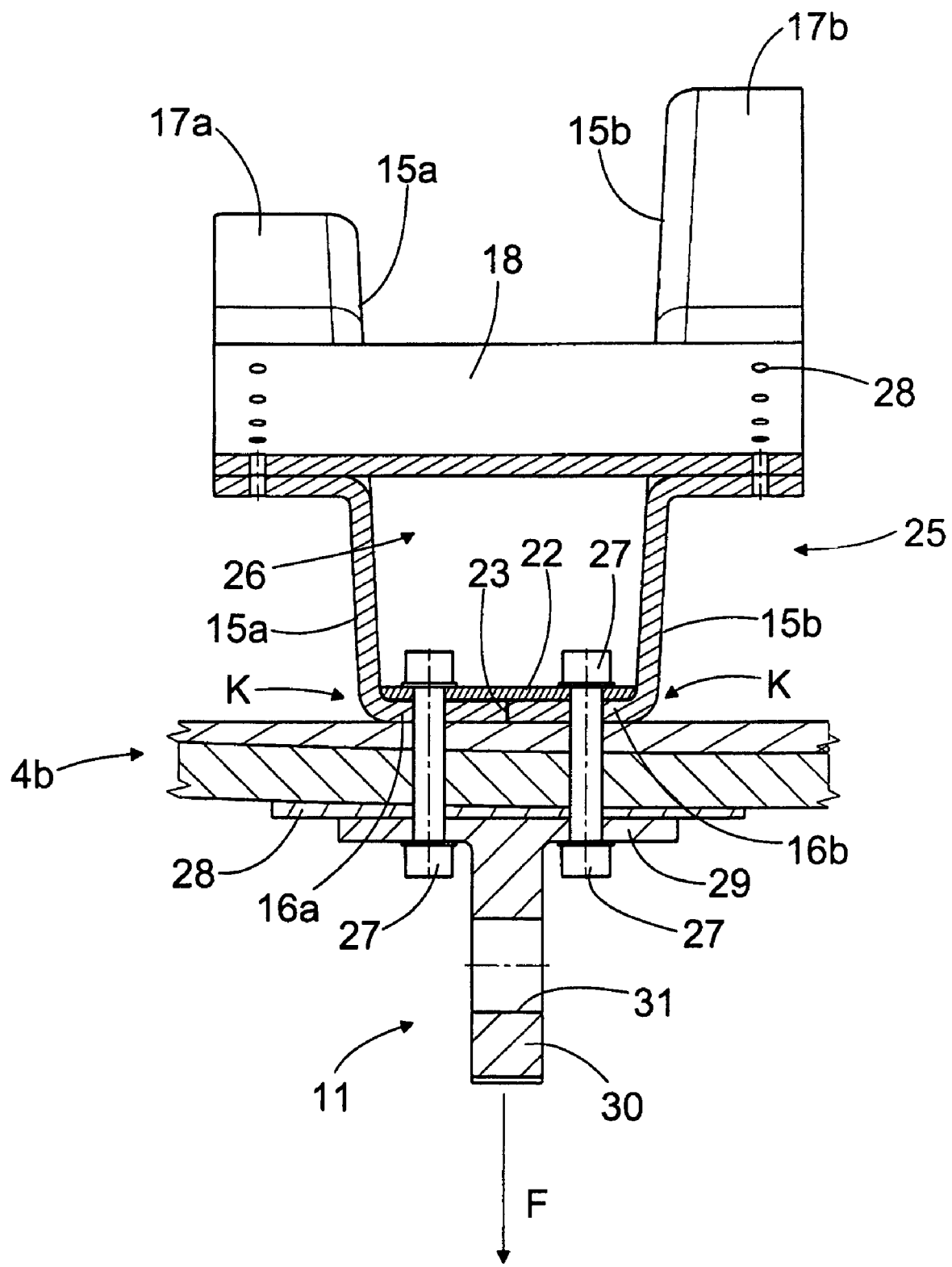

FIG. 6 shows that the side parts 15a, 15b, the bottom parts 16a and 16b and the cover part 18 may provide at the fastening point 25 a cross section having the shape of a closed tube 26. The upper ends of the fastening bolts 27 of the fastening lug 11 may be inside the closed tube structure structure 26. The cover part 18 may be arranged in its place only after the fastening bolts 27 have been mounted. The cover part 18 may be fastened to the broadening sections 17a, 17b by rivets 28 or screws, for example. A reinforcing plate 22, which may distribute loads between the fastening bolts 27 and the bottom part 16, may be arranged against the upper surface of the bottom part 16. The reinforcing plate 22 may comprise ribs, protrusions or other reinforcements for improving the stiffness. The reinforcing plate 22 may also improve the strength of corner regions K between the side parts 15 and the bottom part 16. The reinforcing plate 22 may be made of metal. On the other hand, the reinforcing plate 22 may be integrated as a part of the bottom part 16. The reinforcing plate 22 may thus be, for instance, an insert, which is arranged inside the structure of the composite intermediate support or on the surface thereof. There may further be a support plate 28 between the fastening lug 11 and the bottom skin plate 4b. The fastening lug 11 may comprise a fastening flange 29 and a protrusion part 30 which is transverse to it and may comprise a fastening opening 31 for a fastening pin.

The composite material may comprise one or more fiber reinforcements and one or more binders. The reinforcing fiber may be, for instance, glass fiber, carbon fiber, aramid fiber or the like. The binder may be a plastic material, such as resin or the like.

The composite parts may be manufactured by an RTM method (Resin Transfer Molding), for example. RTM is suitable for manufacturing complex, dimensionally accurate pieces. The reinforcements or reinforcing preforms are set into a mould, after which the mould is closed. Thereafter, resin or a similar binder may be injected into the mould. It is also possible to use a prepreg material, i.e. a prepregnated reinforcement, which may be hardened in an autoclave.

In some cases, the intermediate part or at least some of its components may be made of a light metal, such as aluminum.

It is to be mentioned that in this application, the word "air-craft" refers to different kinds of airplanes, airships, satellites, space shuttles and to other feasible flying equipment. In addition to motor suspensions, the fastening arrangement and intermediate support of the invention may also be applied in other similar situations. For instance, an additional fuel tank or some other load may be suspended from the intermediate support arranged between two support surfaces by means of a fastening lug or a similar fastening ele-fastening lug or a similar fastening element. Furthermore, a fastening lug of an actuator or a hinge or the like of a movable control surface, for example, may be supported on the intermediate support.

It is also to be noted that the fastening lug also refers to other fastening elements suitable for this purpose, the construction of which may differ from the example shown in the figures. However, what is common to different fastening lugs and fastening elements is that their purpose is to transmit forces to the intermediate support.

In some cases, features described in the present application may be used as such, despite the other features. On the other hand, features described in the present application may, where necessary, be joined together to form different combinations.

The drawings and the related description are only intended to illustrate the idea of the invention. In its details, the invention may vary within the scope of the claims.

What is claimed is:

1. An aircraft wing comprising:
   at least one front spar in the region of the front edge of the wing,
   at least one rear spar in the region of the trailing edge of the wing,
   a plurality of wing ribs between the front spar and the rear spar,
   top skin plates and bottom skin plates,
   a plurality of stringers between the skin plates and the wing ribs,
   at least one intermediate support arranged between two adjacent wing ribs,
   at least one fastening lug for fastening a motor, the fastening lug being supported on the intermediate support and located on the side of the lower surface of the wing,
   and wherein the cross section of the intermediate support comprises a vertical first side part and a vertical second side part at a distance from one another,
   and wherein at least at the fastening lug there is a bottom part, which is attached to the lower parts of the side parts and is transverse to the side parts,
   and the fastening lug is fastened to the bottom part of the intermediate support.

2. A wing as claimed in claim 1, wherein
   in the section between the side parts the fastening lug is fastened to the bottom part of the intermediate support by means of a plurality of fastening bolts.

3. A wing as claimed in claim 1, wherein
   the upper edges of the first side part and those of the second side part curve towards the bottom part, when viewed from the side, whereby in the centre section the intermediate support extends a shorter distance upwards than at the wing ribs, and in the wing there is between the wing ribs a crawl space, which is defined in the height direction by the intermediate support and the top skin plate.

4. A wing as claimed in claim 1, wherein
the fastening lug supported on the intermediate support is arranged to support the rear part of the motor of the aircraft.

5. A fastening arrangement in an aircraft, the fastening arrangement comprising:
in an aircraft wing, a first support piece and a second support piece at a distance from the first support piece,
at least one intermediate support, which is a longitudinal piece, the first end of which is fastened to the first support piece and the second end of which is fastened to the second support piece,
at least one fastening point in the section between the first end and second end of the intermediate support, to which fastening point a fastening lug is fastened to direct a transverse load to the intermediate support, the intermediate support being arranged to transmit the load further to the support pieces of the wing,
and wherein the cross section of the intermediate support comprises a vertical first side part and a vertical second side part at a distance from one another,
and wherein at least at the fastening lug there is a bottom part, which is attached to the lower parts of the side parts and is transverse to the side parts,
and the fastening lug is fastened to the bottom part of the intermediate support.

6. A fastening arrangement as claimed in claim 5, wherein
at the fastening lug at least one reinforcing plate is arranged against the upper surface of the bottom part between the side parts,
the fastening lug is fastened to the intermediate support by means of a plurality of fastening bolts,
and the fastening bolts extend to the side of the upper surface of the reinforcing plate.

7. A fastening arrangement as claimed in claim 5, wherein
the support pieces are wing ribs,
and at its first end the intermediate support is fastened by means of fastening elements to the flank surface of the first wing rib and at its second end to the flank surface of the second wing rib.

8. A fastening arrangement as claimed in claim 5, wherein
the upper edges of the first side part and those of the second side part curve towards the bottom part, when viewed from the side, whereby in the centre section the intermediate support extends a shorter distance upwards than at the support pieces.

9. A fastening arrangement as claimed in claim 5, wherein
the intermediate support comprises two separate side components, namely the first side component and the second side component,
each side component comprises a substantially vertical side part and a substantially horizontal bottom part,
and the side components are connected to one another at least at their bottom parts.

10. A fastening arrangement as claimed in claim 5, wherein
the intermediate support comprises two separate side components, namely the first side component and the second side component,
each side component comprises a substantially vertical side part and a substantially horizontal bottom part,
the side components are connected to one another at least at their bottom parts,
the side components are made of a composite and manufactured with a similar mould,
and the first side component is turned 180° with respect to the second side component before they are joined together.

11. A fastening arrangement as claimed in claim 5, wherein
the upper edges of the first side part and second side part of the intermediate support comprise transverse broadening sections.

12. A fastening arrangement as claimed in claim 5, wherein
at the fastening lug the free upper edges of the first side part and second side part of the intermediate support are supported on one another by means of at least one cover part, whereby the intermediate support has a closed, tube-like cross section at the fastening lug.

13. A fastening arrangement as claimed in claim 5, wherein
the intermediate support is fastened to the support pieces by means of a plurality of separate fastening elements.

14. A fastening arrangement as claimed in claim 5, wherein
the intermediate support is fastened to the support pieces by means of the fastening elements, which are integrated as parts of the side parts.

15. A fastening arrangement as claimed in claim 5, wherein
at least the bottom part and side parts of the intermediate support are made of a composite material comprising at least one reinforcing fiber and at least one polymeric binder.

16. A fastening arrangement as claimed in claim 5, wherein
the fastening arrangement is arranged to support the motor of the aircraft on the side of the lower surface of the wing.

17. An intermediate support for an aircraft wing, the intermediate support being a longitudinal piece and comprising:
fastening elements at the first end and second end of the intermediate support,
a fastening point in the section between the first end and the second end for fastening a fastening lug,
and wherein the cross section of the intermediate support comprises a vertical first side part and a vertical second side part at a distance from one another,
and wherein at least at the fastening point there is a bottom part, which is attached to the lower parts of the side parts and is transverse to the side parts, whereby the fastening lug may be fastened to the bottom part of the intermediate support,
and wherein the upper edges of the first side part and those of the second side part curve towards the bottom part, when viewed from the side, whereby in the centre section the intermediate support extends a shorter distance upwards than at the ends.

* * * * *